United States Patent
Qin et al.

(10) Patent No.: US 10,165,327 B2
(45) Date of Patent: Dec. 25, 2018

(54) VIDEO STUDIO CREATING METHOD AND SERVICE DEVICE

(71) Applicant: GUANGZHOU HUADUO NETWORK TECHNOLOGY CO., LTD., Guangzhou, Guangdong (CN)

(72) Inventors: Junjie Qin, Guangdong (CN); Songlong Lin, Guangdong (CN); Guangxing Xu, Guangdong (CN); Guan Liu, Guangdong (CN); Guanghao Huang, Guangdong (CN)

(73) Assignee: GUANGZHOU HUADUO NETWORK TECHNOLOGY CO., LTD., Guangzhou, Guangdong (CN)

( * ) Notice: Subject to any disclaimer, the term of this patent is extended or adjusted under 35 U.S.C. 154(b) by 0 days.

(21) Appl. No.: 15/527,922

(22) PCT Filed: Dec. 30, 2014

(86) PCT No.: PCT/CN2014/095505
§ 371 (c)(1),
(2) Date: May 18, 2017

(87) PCT Pub. No.: WO2016/082281
PCT Pub. Date: Jun. 2, 2016

(65) Prior Publication Data
US 2018/0167689 A1 Jun. 14, 2018

(30) Foreign Application Priority Data

Nov. 26, 2014 (CN) .......................... 2014 1 0698392

(51) Int. Cl.
*H04N 21/472* (2011.01)
*H04N 21/2187* (2011.01)
(Continued)

(52) U.S. Cl.
CPC ... *H04N 21/47202* (2013.01); *H04N 21/2187* (2013.01); *H04N 21/25891* (2013.01); *H04N 21/485* (2013.01)

(58) Field of Classification Search
CPC ......... H04N 21/47202; H04N 21/2187; H04N 21/25891; H04N 21/485
See application file for complete search history.

(56) References Cited

U.S. PATENT DOCUMENTS

2011/0280540 A1* 11/2011 Woodman .......... H04N 21/2187
386/201
2012/0117471 A1* 5/2012 Amidon ........... H04N 21/47214
715/716
(Continued)

FOREIGN PATENT DOCUMENTS

| CN | 101127767 A | 2/2008 |
| CN | 102185800 A | 9/2011 |

(Continued)

Primary Examiner — Pankaj Kumar
Assistant Examiner — Alexander Boyd
(74) Attorney, Agent, or Firm — Young Basile Hanlon & MacFarlane, P.C.

(57) ABSTRACT

Disclosed are a video studio creating method and a service device. The method includes: receiving a live video application-based live video request instruction sent by a client, in which the live video request instruction includes user information; acquiring live channel information associated with the user information; acquiring a live channel configuration parameter set corresponding to the live channel information, and creating a video studio according to the live channel configuration parameter set; and outputting an interactive interface of the video studio to the client.

16 Claims, 6 Drawing Sheets

(51) Int. Cl.
*H04N 21/258* (2011.01)
*H04N 21/485* (2011.01)

(56) References Cited

U.S. PATENT DOCUMENTS

| | | |
|---|---|---|
| 2012/0166627 A1 | 6/2012 | Kraiman et al. |
| 2012/0236160 A1 | 9/2012 | Rezek |
| 2013/0070047 A1* | 3/2013 | Digiovanni ........ H04N 21/4728 |
| | | 348/36 |
| 2014/0115637 A1* | 4/2014 | Stanforth ................ H04W 4/02 |
| | | 725/62 |
| 2014/0126713 A1* | 5/2014 | Ristock ............... H04M 3/5231 |
| | | 379/265.09 |

FOREIGN PATENT DOCUMENTS

| | | |
|---|---|---|
| CN | 102547600 A | 7/2012 |
| CN | 103139599 A | 6/2013 |
| CN | 103746820 A | 4/2014 |
| CN | 103945236 A | 7/2014 |
| KR | 10-2007-0015766 A | 2/2007 |

* cited by examiner

VIDEO STUDIO CREATING METHOD AND SERVICE DEVICE

CROSS-REFERENCE TO RELATED APPLICATION(S)

This application is a national stage of PCT/CN2014/095505, filed on Dec. 30, 2014, which claims priority to Chinese Patent Application No. 201410698392.3, filed on Nov. 26, 2014, the content of both of which are hereby incorporated by reference in their entireties.

TECHNICAL FIELD

The present disclosure relates to the field of computer technology, and more particularly, to a video studio creating method and a service device.

BACKGROUND

Currently, comprehensive entertainment clients, in which various functionalities such as group chatting, live video, channel karaoke, application games and online films are integrated, are widely applied to terminal devices, such as a personal computer, a mobile phone, etc. In practice application, a user can watch a video through a video studio (the video studio here can be equivalent to a sub-channel of a certain live channel) of an entertainment client, so that the user can watch the video played on the sub-channel by means of the video studio, and broadcast to other users in the same video studio. The user can also watch the video of an anchor in a current video studio, and hear the voice of the anchor, etc.

However, steps of creating a video studio through a client are tedious at present, since a user usually needs to manually input lots of information or parameters, such as, re-entering a login username, setting playing permission, activating a username and activating a channel, etc. Thus, the existing method increases the threshold and difficulty of performing live video, and is not conductive to build and use the video studio for the user; at the same time, in the process of building the video studio, there are frequent information interactions between the client and a service device, which increases the workload of the service device.

SUMMARY

To solve the above problems, an embodiment of the present disclosure aims to provide a video studio creating method and a service device, so that the video studio can be automatically configured, and thus the workload of the service device can be reduced, the threshold and difficulty of performing live video are reduced, and the building and use efficiency of the video studio can be improved.

In order to achieve the above purposes, the embodiment of the present disclosure provides a video studio creating method on one hand. The video studio creating method may include the steps of:

receiving a live video application-based live video request instruction sent by a client, wherein the live video request instruction includes user information;

acquiring live channel information associated with the user information;

acquiring a live channel configuration parameter set corresponding to the live channel information, and creating a video studio according to the live channel configuration parameter set; and outputting an interactive interface of the video studio to the client.

The embodiment of the present disclosure provides an application service device on the other hand. The application service device may include:

an instruction acquiring module, used to receive a live video application-based live video request instruction sent by a client, wherein the live video request instruction comprises user information;

an information acquiring module, used to acquire live channel information associated with the user information;

a creating module, used to acquire a live channel configuration parameter set corresponding to the live channel information, and create a video studio according to the live channel configuration parameter set; and an outputting module, used to output an interactive interface of the video studio to the client.

In this embodiment, when receiving a live video request instruction sent by a client, an application service device acquires associated live channel information according to user information, and acquires a live channel configuration parameter set corresponding to the live channel information, uses the live channel configuration parameter set to configure a video studio, and outputs an interactive interface of the video studio to the client for display. By encapsulating the process of creating the video studio, the video studio can be automatically configured, and live video can be simply and quickly performed with one click, thus the threshold and difficulty of performing the live video are reduced, and the building and user efficiency of the video studio can be improved. At the same time, by acquiring the live channel configuration parameter set corresponding to the live channel information to configure the video studio, the interactions between the clients and the service device are decreased, thus the workload of the service device can be reduced.

BRIEF DESCRIPTION OF THE DRAWINGS

In order to illustrate the embodiments or existing technical solutions more clearly, a brief description of drawings that assists the description of embodiments of present disclosure or existing art will be provided below.

DETAILED DESCRIPTION

The disclosure will now be described in detail on the basis of preferred embodiments and drawings. It is to be understood that various changes may be made without departing from the spirit and scope of the present disclosure and the embodiments of the present disclosure and features in the embodiments can be combined with each other.

In order that a video studio creating method and a service device according to the embodiment of the present disclosure can be better understood, a network architecture of a video studio creating system applied to the embodiment of the present disclosure is firstly described.

Figure 1:
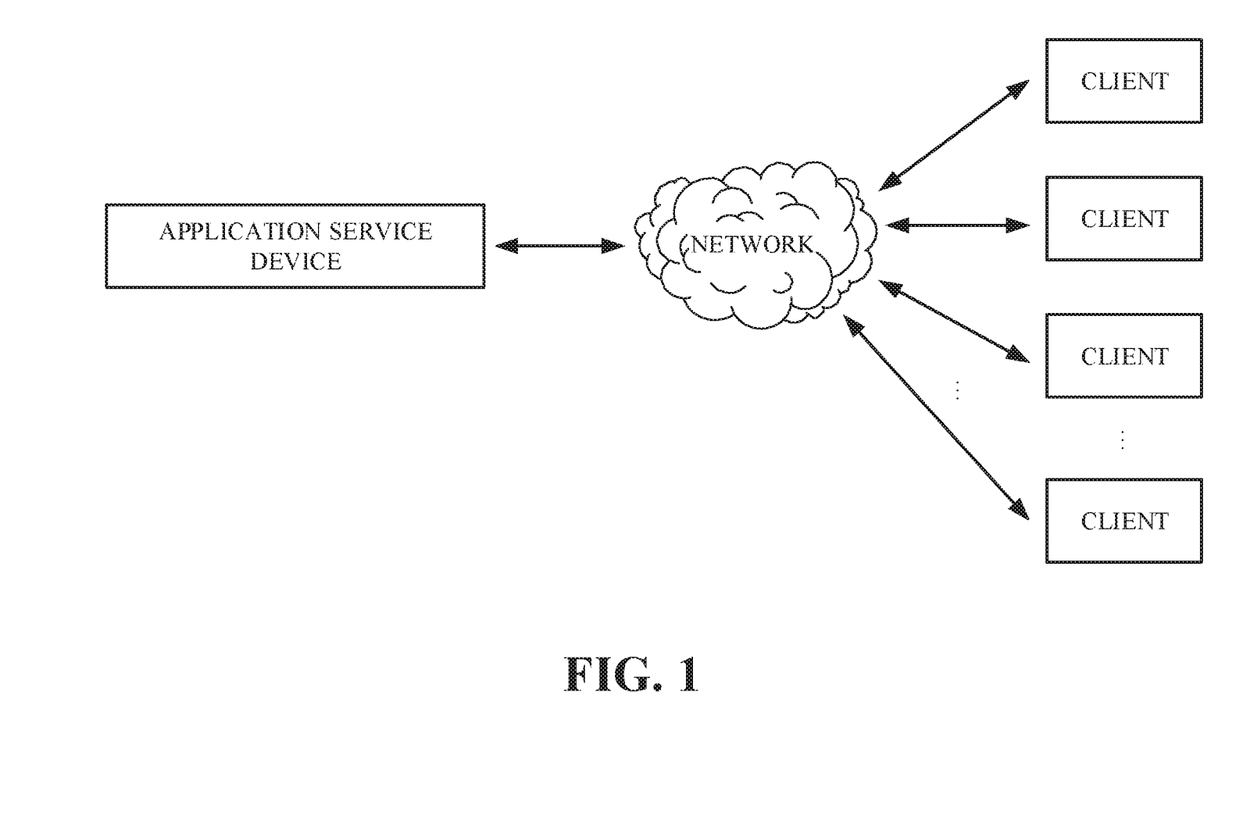
FIG. 1 is a network architecture diagram of a video studio creating system according to an embodiment of the present disclosure.

Referring to FIG. 1, FIG. 1 is a network architecture diagram of a video studio creating system according to an embodiment of the present disclosure. As shown in FIG. 1, the network architecture may include, but not limited to, a service device and multiple clients. Wherein, the service device is also called a back-end server, or a component server, etc. The service device can establish communication connections with the multiple clients through the Internet. In the network architecture as shown in FIG. 1, parts of the multiple clients can be taken as host clients, while the rest clients which can be served as audience clients can access a video studio of any host client on a preset channel. In the embodiment, simply speaking, the channel is a virtual space (or a virtual room) where the host client is, so that the host client can build a video studio in the channel (or virtual space) in order to become an anchor, or the host client can become an anchor in video studios built by other clients. The audience clients in the video studio cannot only watch live contents of the host client, such as live contents of a game, but also establish voice or text interactions with the host client. The host client not only have the control to accept the audience clients or move out the audience clients on the same channel, but also have the initiative to perform live video. In the embodiment, the host client and the audience client can be a rich client in which various functionalities such as group chatting, live video, channel karaoke, application games and online films are integrated. In the network architecture as shown in FIG. 1, the host client and the audience clients can be run on different user equipments including, but not limited to, a mobile phone, a mobile computer, a tablet computer, a PDA (personal digital assistant), a media player, a smart TV (television), a smart watch, a pair of smart glasses and a smart bracelet.

Based on the network architecture as shown in FIG. 1, the video studio creating method according to an embodiment of the present disclosure will be described in detail in combination with FIG. 2 and FIG. 3.

Figure 2:
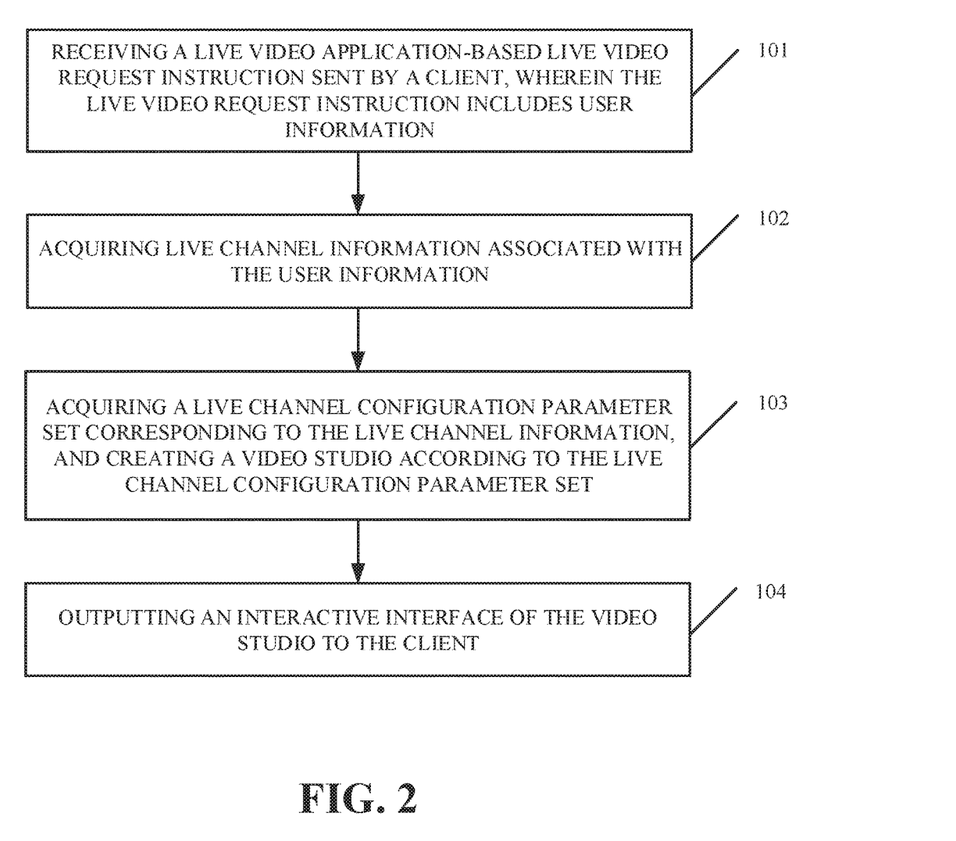
FIG. 2 is a flowchart of a video studio creating method according to an embodiment of the present disclosure.

Referring to FIG. 2, FIG. 2 is a flowchart of a video studio creating method according to an embodiment of the present disclosure. As shown in FIG. 2, the video studio creating method according to the embodiment of the present disclosure may at least include the steps S101~S104.

Step S101, receiving a live video application-based live video request instruction sent by a client, wherein the live video request instruction includes user information.

In detail, a client user (namely, a user that a client belongs to) can log in the live video application through the user information. In this embodiment, the user information is an ID (identity) allocated by an application service device when the client user registers with the live video application. Then, the client user can click a live video request trigger port in a live video application interface through the client. In this embodiment, the live video request trigger port is a trigger icon in the live video application interface. When detecting that the live video request trigger port is clicked or triggered, the client sends the live video request instruction based on the user information of the live video application to the application service device. Next, the application service device receives the live video request instruction, and acquires the user information carried by the live video request instruction.

Step S102, acquiring live channel information associated with the user information.

In detail, the application service device finds the live channel information associated with the user information. In this embodiment, the live channel information is a channel name. A live channel corresponding to the channel name can be a virtual space in the live video application, and is preferably a live game channel in the live video application.

It should be noted that, when the client user has already added a live channel where the client user is an anchor, or when the client user has added a live channel where the client user is not an anchor on the application service device through the client, the application service device would record the channel name of the live channel, and send the channel name to the client for display. Of cause, the channel name of the live channel recorded by the application service device is at least one channel name; namely, when the client user has more than one live channel, the live video request instruction further carries a channel name of a live channel selected by the client user in the live video application interface.

When the client user has not added a live channel where the client user is an anchor, or when the client user has not added a live channel where the client user is not an anchor, the application service device can prompt the client user to input a channel name of a live channel in the live video application interface, thus the application service device can acquire the inputted channel name of the live channel.

Step S103, acquiring a live channel configuration parameter set corresponding to the live channel information, and creating a video studio according to the live channel configuration parameter set.

In detail, the application service device can acquires the live channel configuration parameter set corresponding to the live channel information. In this embodiment, in the case that the client user has already added a live channel, the application service device directly acquires a live channel identifier corresponding to the channel name, and adds the user information to a live channel corresponding to the live channel identifier according to the live channel identifier. The application service device further configures running state of the live channel identifier and running state of the user information, and creates a video studio on the live channel after configuring the running states. The video studio is specifically a sub-channel of the live channel.

In the case that the client user has not added a live channel, the application service device creates a corresponding live channel and a corresponding live channel identifier according to the inputted channel name, and adds the user information to the live channel according to the live channel identifier. The application service device further configures running state of the live channel identifier and running state of the user information, and creates a video studio on the live channel after configuring the running states.

Step S104, outputting an interactive interface of the video studio to the client.

In detail, the application service device outputs the interactive interface of the created video studio to the client, and the client user can perform live video by means of the interactive interface of the video studio displayed on the client.

In this embodiment, when receiving a live video request instruction sent by a client, an application service device acquires associated live channel information according to user information, and acquires a live channel configuration parameter set corresponding to the live channel information, uses the live channel configuration parameter set to configure a video studio, and outputs an interactive interface of the video studio to the client for display. By encapsulating the process of creating the video studio, the video studio can be automatically configured, and live video can be simply and quickly performed with one click, thus the threshold and difficulty of performing the live video are reduced, and the building and user efficiency of the video studio can be improved. At the same time, by acquiring the live channel configuration parameter set corresponding to the live channel information to configure the video studio, the interactions between the clients and the service device are decreased, thus the workload of the service device can be reduced.

Figure 3:
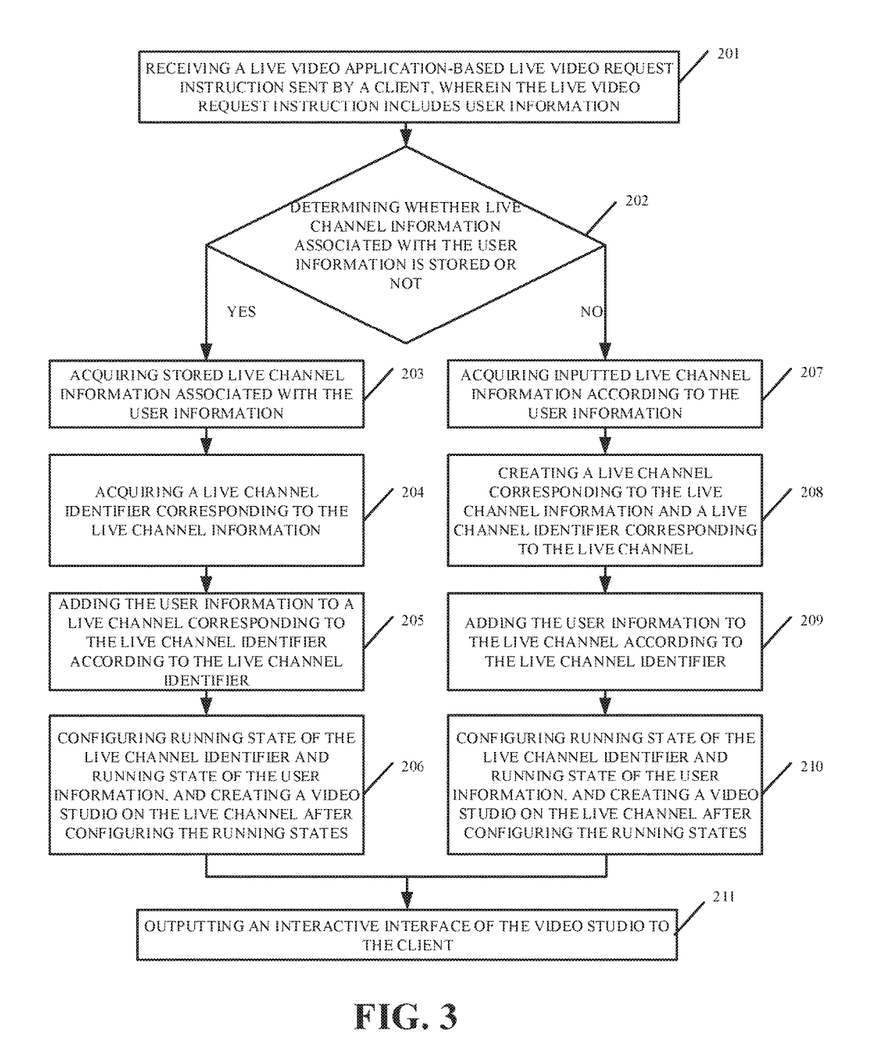
FIG. 3 is a flowchart of a video studio creating method according to another embodiment of the present disclosure.

Referring to FIG. 3, FIG. 3 is a flowchart of a video studio creating method according to another embodiment of the present disclosure. As shown in FIG. 3, the video studio creating method according to another embodiment of the present disclosure may at least includes the steps S201~S211.

Step S201, receiving a live video application-based live video request instruction sent by a client, wherein the live video request instruction comprises user information.

Step S202, determining whether live channel information associated with the user information is stored or not.

In detail, an application service device acquires the user information carried by the live video request instruction, and finds the live channel information associated with the user information. In this embodiment, the live channel information is a channel name. A live channel corresponding to the channel name can be a virtual space in the live video application, and is preferably a live game channel in the live video application.

It should be noted that, when a client user has already added a live channel where the client user is an anchor, or when a client user has added a live channel where the client user is not an anchor on the application service device through the client, the application service device would execute for the steps S203~S206.

When the client user has not added a live channel where the client user is an anchor, or when the client user has not added a live channel where the client user is not an anchor, the application service device would execute for the steps S207~S210.

Step S203, acquiring stored live channel information associated with the user information.

In detail, the application service device would record the channel name of the live channel, and send the channel name to the client for display. Of cause, the channel name of the live channel recorded by the application service device is at least one channel name; namely, when the client user has more than one live channel, the live video request instruction further carries a channel name of a live channel selected by the client user in the live video application interface. The application service device acquires the selected channel name of the live channel.

Step S204, acquiring a live channel identifier corresponding to the live channel information.

In detail, in the case that the client user has already added a live channel, the application service device directly acquires a live channel identifier corresponding to the channel name.

Step S205, adding the user information to a live channel corresponding to the live channel identifier according to the live channel identifier.

In detail, the application service device adds the user information to the live channel corresponding to the live channel identifier according to the live channel identifier. In this embodiment, the application service device firstly determines whether the live channel corresponding to the live channel identifier exists or not. When the live channel does not exist, the application service device sends prompt information for prompting that the live channel does not exist to the client through the user information.

When the live channel exists, the application service device then determines whether a password of the live channel is preset or not. When the password exists, the application service device further determines the level property of the user information. When the level property of the user information is first-level property, the application service device sends prompt information for prompting the client user to input the password to the client through the user information.

When the password inputted by the client user is correct, or when the level property of the user information is second-level property, or when the live channel has no the password, the application service device further determines whether the user information is banned or not, or whether an IP (Internet protocol) address of the client is banned or not, or whether the user information is moved out by someone, such as an administrator of the live channel, or not. If yes, the application service device sends prompt information for prompting that the user information is banned, or prompt information for prompting that the IP address of the client is banned, or prompt information for prompting that the user information is moved out by someone, such as an administrator of the live channel, to the client through the user information according to an actual reason.

When the user information is not banned, the IP address of the client is not banned, and the user information is not moved out by someone, such as an administrator of the live channel, the application service device finally determines whether the current user number of the live channel reaches a preset user number threshold or not. If the preset user number threshold is reached, then when the level property of the user information is the first-level property, the application service device sends prompt information for prompting that the live channel is full because of too many users to the client through the user information. When the level property of the user information is the second-level property, or when the preset user number threshold is not reached, the application service device adds the user information to the live channel corresponding to the live channel identifier.

It should be noted that, the level property can be distinguished and defined according to the hierarchy of the user information, such as the first-level property and the second-level property, and different hierarchies of the user information correspond to different using permission to the live channel application. The first-level property and the second-level property are used here only to distinguish the different hierarchies, and the number of the level properties that can be distinguished and defined is not limited in this embodiment.

Step S206, configuring running state of the live channel identifier and running state of the user information, and creating a video studio on the live channel after configuring the running states.

In detail, the application service device can use a preset live template to configure the live channel. Wherein, the preset live template may include, but not limited to, a live game template, a live education template, and a live entertainment template. In this embodiment, the application service device determines whether the current live template of the live channel is the preset live template or not. When the current live template is not the preset live template, or when the responses from the application service device time out, the application service device automatically uses the preset live template to configure the live channel. When the live channel is not configured successfully, the application service device can send prompt information for prompting that a template configuration fails to the client through the user information. When the live channel is configured successfully, or when the current live template is the preset live template, the application service device sets the running state of the live channel identifier and the running state of the user information as activated states. The application service device can create the video studio on the live channel only if the running state of the live channel identifier and the running state of the user information are the activated states. When the running state of the live channel identifier is not the activated state and/or when the running state of the user information is not the activated state, the application service device can issue an activation notification in order that a database of the application service device restores the running state of the live channel identifier as the activated state and/or the running state of the user information as the activated state. Wherein, functionalities of the live channel can be used only if the running state of the live channel identifier is the activated state, and the user information can possess a functionality to be an anchor only if the running state of the user information is the activated state.

It should be noted that, before setting the running states, the application service device can further determine whether a live relationship between the user information and the live channel exists or not; namely, the application service device determines whether the user information can be added as an anchor or not. When the user information is the owner of the live channel, or when the live relationship between the user information and the live channel exists, the application service device executes the step of setting the running states. When the live relationship between the user information and the live channel does not exist, and the user information is not the owner of the live channel, the application service device can send prompt information for prompting the user to request the owner of the live channel to add the user as the anchor to the client according to the user information.

According to video studio identifier of the live channel corresponding to the live channel information, the application service device can add the user information to the video studio corresponding to the video studio identifier. The video studio is specifically a sub-channel of the live channel. In this embodiment, the application service device needs to determine whether there exists other user information performing live video in the video studio corresponding to the video studio identifier at present or not. When there exists the other user information performing the live video at present, the application service device can terminate the live video performed by the other user information. When the live video performed by the other user information is terminated, or when there does not exist the other user information performing the live video in the video studio at present, the application service device further determines whether the current mode of the video studio is a microphone-order mode or not. Wherein, the microphone-order mode is a mode where multiple anchors (namely, multiple user information applying to be anchors) in the current video studio perform live video according to a preset order. If the current mode of the video studio is not the microphone-order mode, then when the level property of the user information is the first-level property, the application service device sends prompt information for prompting that the microphone-order mode cannot be set to the client according to the user information, and when the level property of the user information is the second-level property, the application service device can set the current mode of the video studio as the microphone-order mode. When the current mode of the video studio is the microphone-order mode, the application service device further determines whether the microphone is banned to be scrambled for among the user information in the microphone-order mode or not; namely, the application service device determines whether the user information can be set as the current anchor immediately or not. If the microphone is banned to be scrambled for, then when the level property of the user information is the first-level property, the application service device sends prompt information for prompting that the user information cannot become an anchor at present according to the user information, and when the level property of the user information is the second-level property, the application service device can set the user information as the current anchor.

Step S207, acquiring inputted live channel information according to the user information.

In detail, the application service device can prompt the client user to input a channel name of a live channel in the live video application interface, thus the application service device can acquire the inputted channel name of the live channel.

Step S208, creating a live channel corresponding to the live channel information and a live channel identifier corresponding to the live channel.

In detail, the application service device creates the live channel corresponding to the channel name of the live channel and the live channel identifier corresponding to the live channel.

Step S209, adding the user information to the live channel according to the live channel identifier.

In detail, the application service device can add the user information to the live channel according to the live channel identifier.

Step S210, configuring running state of the live channel identifier and running state of the user information, and creating a video studio on the live channel after configuring the running states.

In detail, the application service device uses a preset live template to configure the live channel, and sets the running state of the live channel identifier and the running state of the user information as activated states. When the running state of the live channel identifier and the running state of the user information are the activated states, the application service device creates the video studio on the live channel, and at the same time, sets the mode of the video studio as a microphone-order mode. The application service device further sets the user information as the anchor in the video studio; namely, the application service device adds the user information to the video studio. The video studio is specifically a sub-channel of the live channel.

Step S211, outputting an interactive interface of the video studio to the client.

In detail, the application service device outputs the interactive interface of the created video studio to the client, and the client user can perform live video by means of the interactive interface of the video studio displayed on the client.

In this embodiment, the application service device can output the interactive interface of the video studio to the client according to the live video mode instructed by the live video request instruction. The live video request instruction further carries the instructed live video mode, and the live video mode may be a live process mode, a live desktop capturing mode, or a live camera capturing mode. The application service device can previously determine whether the user information has live permission or not. When the user information has the live permission, the client user can select any one mode out of the live process mode, the live desktop capturing mode and the live camera capturing mode to perform the live video. When the user information does not have the live permission, the client user can only select the live process mode to perform the live video.

The live process mode is a mode where the live video is performed by invoking processes (e.g., a game process, etc) run by the system. The live desktop capturing mode is a mode where the live video is performed by capturing the content currently displayed on a display device (e.g., a monitor, etc) connected with the client. The live camera capturing mode is a mode where the live video is performed by capturing the content shot by a camera connected with the client.

Since the security and privacy required by the live desktop capturing mode and the live camera capturing mode are higher than that required by the live process mode, it is ensured that an anchor performing the live video is an authenticated user by setting the live permission, thus the security of the live video is guaranteed.

Wherein, specific technical details of the step S201 in this embodiment can be seen in the step S101 in the embodiment as shown in FIG. 2, so it is unnecessary to go into details here.

In this embodiment, when receiving a live video request instruction sent by a client, an application service device acquires associated live channel information according to user information, and acquires a live channel configuration parameter set corresponding to the live channel information, uses the live channel configuration parameter set to configure a video studio, and outputs an interactive interface of the video studio to the client for display. By encapsulating the process of creating the video studio, the video studio can be automatically configured, and live video can be simply and quickly performed with one click, thus the threshold and difficulty of performing the live video are reduced, and the building and user efficiency of the video studio can be improved. At the same time, by acquiring the live channel configuration parameter set corresponding to the live channel information to configure the video studio, the interactions between the clients and the service device are decreased, thus the workload of the service device can be reduced. By setting live permission, it is ensured that an anchor who performs the live video is an authenticated user, thus the security of the live video is guaranteed.

In the network architecture as shown in FIG. 1, the application service device according to an embodiment of the present disclosure will be described in detail in combination with FIG. 4 to FIG. 9. It should be noted that, the application service device as shown in FIG. 4 to FIG. 9 is used to execute the method as shown in FIG. 2 and the method as shown in FIG. 3. For convenience, FIG. 4 to FIG. 9 just shows the parts related to this embodiment, and the unrevealed specific technical details can be seen in the embodiment as shown in FIG. 2 and in the embodiments as shown in FIG. 3.

Figure 4:
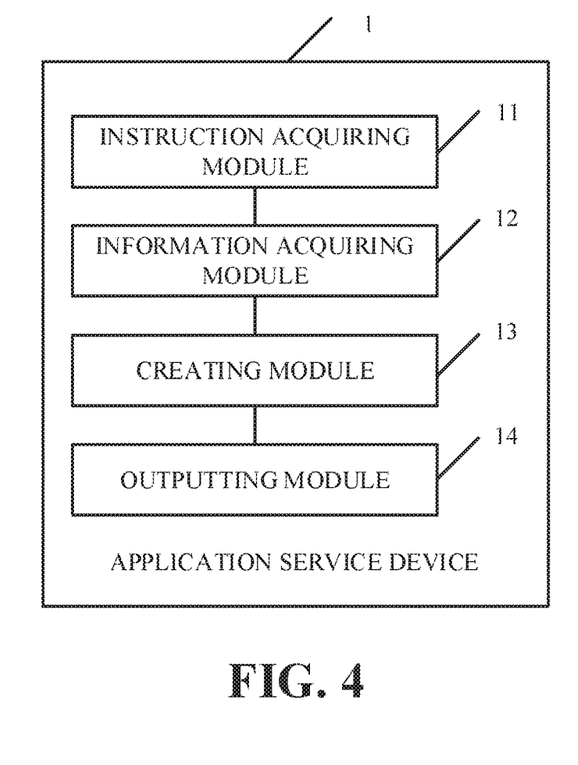
FIG. 4 is a block diagram of an application service device according to an embodiment of the present disclosure.

Referring to FIG. 4, FIG. 4 is a block diagram of an application service device according to an embodiment of the present disclosure. As shown in FIG. 4, the application service device 1 according to the embodiment of the present disclosure may at least include: an instruction acquiring module 11, an information acquiring module 12, a creating module 13 and an outputting module 14.

The instruction acquiring module 11 is used to receive a live video application-based live video request instruction sent by a client, wherein, the live video request instruction includes user information.

In detail, a client user (namely, a user that a client belongs to) can log in the live video application through the user information. In this embodiment, the user information is an ID allocated by the application service device 1 when the client user registers with the live video application. Then, the client user can click a live video request trigger port in a live video application interface through the client. In this embodiment, the live video request trigger port is a trigger icon in the live video application interface. When detecting that the live video request trigger port is clicked or triggered, the client sends a live video request instruction based on the user information of the live video application to the application service device 1. Next, the instruction acquiring module 11 receives the live video request instruction, and acquires the user information carried by the live video request instruction.

The information acquiring module 12 is used to acquire live channel information associated with the user information.

In detail, the information acquiring module 12 finds the live channel information associated with the user information. In this embodiment, the live channel information is a channel name. A live channel corresponding to the channel name can be a virtual space in the live video application, and is preferably a live game channel in the live video application.

It should be noted that, when the client user has already added a live channel where the client user is an anchor, or when the client user has added a live channel where the client user is not an anchor on the application service device 1 through the client, the application service device 1 would record the channel name of the live channel, and send the channel name to the client for display. Of cause, the channel name of the live channel recorded by the application service device 1 is at least one channel name; namely, when the client user has more than one live channel, the live video request instruction further carries a channel name of a live channel selected by the client user in the live video application interface, and the information acquiring module 12 acquires the selected channel name of the live channel selected.

When the client user has not added a live channel where the client user is an anchor, or when the client user has not added a live channel where the client user is not an anchor, the application service device 1 can prompt the client user to input a channel name of a live channel in the live video application interface, thus the information acquiring module 12 can acquire the inputted channel name of the live channel.

Figure 5:
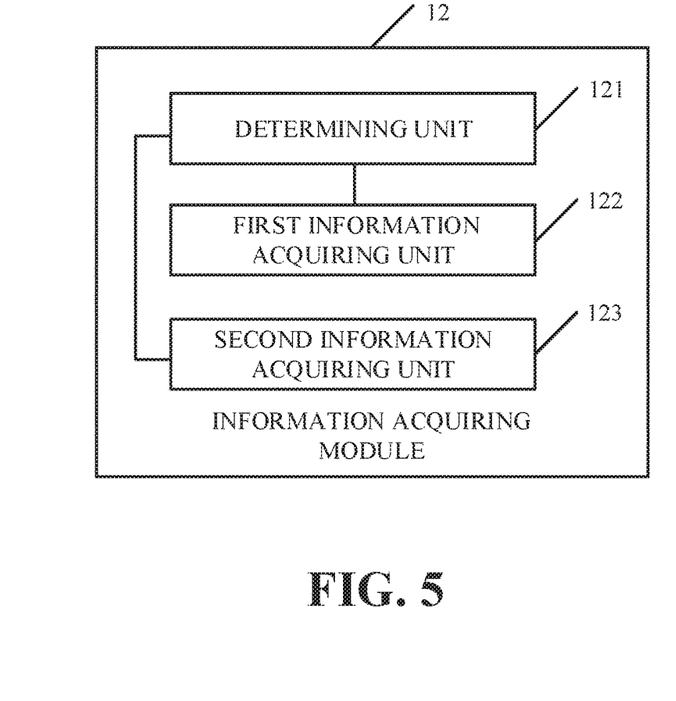
FIG. 5 is a block diagram of an information acquiring module according to an embodiment of the present disclosure.

Referring to FIG. 5, FIG. 5 is a block diagram of an information acquiring module according to an embodiment of the present disclosure. As shown in FIG. 5, the information acquiring module 12 may include: a determining unit 121, a first information acquiring unit 122, and a second information acquiring unit 123.

The determining unit 121 is used to determine whether live channel information associated with the user information is stored or not.

In specific implementations, the determining unit 121 acquires the user information carried by the live video request instruction, and finds the live channel information associated with the user information. In this embodiment, the live channel information is a channel name. A live channel corresponding to the channel name can be a virtual space in the live video application, and is preferably a live game channel in the live video application.

The first information acquiring unit 122 is used to acquire stored live channel information associated with the user information when the determining unit 121 determines that the live channel information associated with the user information is stored.

In specific implementations, when the client user has already added a live channel where the client user is an anchor, or when the client user has added a live channel where the client user is not an anchor on the application service device 1 through the client, the application service device 1 would record the channel name of the live channel, and send the channel name to the client for display. Of cause, the channel name of the live channel recorded by the application service device 1 is at least one channel name; namely, when the client user has more than one live channel, the live video request instruction further carries a channel name of a live channel selected by the client user in the live video application interface. The first information acquiring unit 122 acquires the selected channel name of the live channel.

The second information acquiring unit 123 is used to acquire inputted live channel information according to the user information when the determining unit 121 determines that the live channel information associated with the user information is not stored.

In specific implementations, when the client user has not added a live channel where the user is an anchor, or when the client user has not added a live channel where the client user is not an anchor, the application service device 1 can prompt the client user to input a channel name of a live channel in the live video application interface, thus the second information acquiring unit 123 can acquire the inputted channel name of the live channel.

The creating module 13 is used to acquire a live channel configuration parameter set corresponding to the live channel information, and create a video studio according to the live channel configuration parameter set.

In specific implementations, the creating module 13 acquires the live channel configuration parameter set corresponding to the live channel information. In this embodiment, in the case that the client user has already added a live channel, the creating module 13 directly acquires a live channel identifier corresponding to the channel name, and adds the user information to a live channel corresponding to the live channel identifier according to the live channel identifier. The creating module 13 further configures running state of the live channel identifier and running state of the user information, and creates a video studio on the live channel after configuring the running states. The video studio is specifically a sub-channel of the live channel.

In the case that the client user has not added a live channel, the creating module 13 creates a corresponding live channel and a corresponding live channel identifier according to the inputted channel name, and adds the user information to the live channel according to the live channel identifier. The creating module 13 further configures running state of the live channel identifier and running state of the user information, and creates a video studio on the live channel after configuring the running states.

Figure 6:
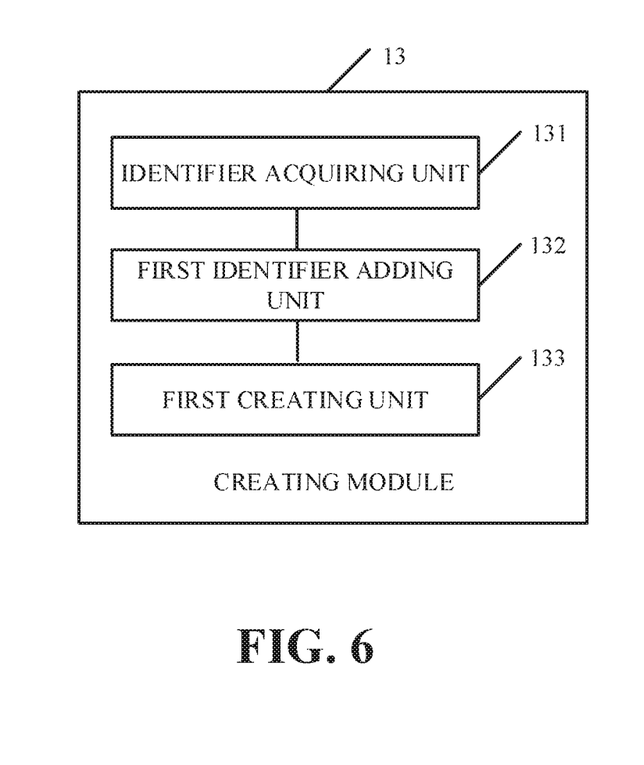
FIG. 6 is a block diagram of a creating module according to an embodiment of the present disclosure.

Optionally, referring to FIG. 6, FIG. 6 is a block diagram of a creating module according to an embodiment of the present disclosure. As shown in FIG. 6, the creating module 13 may include: an identifier acquiring unit 131, a first identifier adding unit 132 and a first creating unit 133.

The identifier acquiring unit 131 is used to acquire a live channel identifier corresponding to the live channel information when the first information acquiring unit 122 acquires the stored live channel information associated with the user information.

In specific implementations, in the case that the client user has already added a live channel, the identifier acquiring unit 131 directly acquires a live channel identifier corresponding to the channel name.

The first identifier adding unit 132 is used to add the user information to a live channel corresponding to the live channel identifier according to the live channel identifier.

In specific implementations, the first identifier adding unit 132 adds the user information to a live channel corresponding to the live channel identifier according to the live channel identifier. In this embodiment, the first identifier adding unit 132 firstly determines whether the live channel corresponding to the live channel identifier exists or not. When the live channel does not exist, the first identifier adding unit 132 sends prompt information for prompting that the live channel does not exist to the client through the user information;

When the live channel exists, the first identifier adding unit 132 then determines whether a password of the live channel is preset or not. When the password exists, the first identifier adding unit 132 further determines the level property of the user information. When the level property of the user information is first-level property, the first identifier adding unit 132 sends prompt information for prompting the client user to input the password to the client through the user information;

When the password inputted by the client user is correct, or when the level property of the user information is second-level property, or when the live channel has no password, the first identifier adding unit 132 further determines whether the user information is banned or not, or whether an IP address of the client is banned or not, or whether the user information is moved out by someone, such as an administrator of the live channel, or not. If yes, the first identifier adding unit 132 sends prompt information for prompting that the user information is banned, or prompt information for prompting that the IP address of the client is banned, or prompt information for prompting that the user information is moved out by someone, such as an administrator of the live channel, to the client through the user information according to an actual reason.

When the user information is not banned, the IP address of the client is not banned, and the user information is not moved out by someone, such as an administrator of the live channel, the first identifier adding unit 132 finally determines whether the current user number of the live channel reaches a preset user number threshold or not. If the preset user number threshold is reached, then when the level property of the user information is the first-level property, the first identifier adding unit 132 sends prompt information for prompting that the live channel is full because of too many users to the client through the user information. When the level property of the user information is the second-level property, or when the preset user number threshold is not reached, the first identifier adding unit 132 adds the user information to the live channel corresponding to the live channel identifier.

It should be noted that, the level property can be distinguished and defined according to the hierarchy of the user information, such as the first-level property and the second-level property, and different hierarchies of the user information correspond to different using permission to the live channel application. The first-level property and the second-level property are used here only to distinguish the different hierarchies, and the number of the level properties that can be distinguished and defined is not limited in this embodiment.

The first creating unit 133 is used to configure the running state of the live channel identifier and the running state of the user information, and create a video studio on the live channel after configuring the running states.

In specific implementations, the first creating unit 133 can use a preset live template to configure the live channel. Wherein, the preset live template may include, but not limited to, a live game template, a live education template and a live entertainment template. In this embodiment, the first creating unit 133 determines whether the current live template of the live channel is the preset live template or not. When the current live template is not the preset live template, or when the responses from the application service device 1 time out, the first creating unit 133 automatically uses the preset live template to configure the live channel. When the live channel is not configured successfully, the first creating unit 133 can send the prompt information for prompting that a template configuration fails to the client through the user information. When the live channel is configured successfully, or when the current live template is the preset live template, the first creating unit 133 sets the running state of the live channel identifier and the running state of the user information as activated states. The first creating unit 133 can create the video studio on the live channel only if the running state of the live channel identifier and the user information are the activated states. When the running state of the live channel identifier is not the activated state and/or when the running state of the user information is not the activated state, the first creating unit 133 can issue an activation notification in order that a database of the application service device 1 restores the running state of the live channel identifier as the activated state and/or the running state of the user information as the activated state. Wherein, functionalities of the live channel can be used only if the running state of the live channel identifier is the activated state, and the user information can possess a functionality to be an anchor only if the running state of the user information is the activated state.

It should be noted that, before setting the running states, the first creating unit 133 can further determine whether a live relationship between the user information and the live channel exists or not; namely, the first creating unit 133 determines whether the user information can be added as an anchor or not. When the user information is the owner of the live channel, or when the live relationship between the user information and the live channel exists, the first creating unit 133 executes for setting the running states. When the live relationship between the user information and the live channel does not exist, and the user information is not the owner of the live channel, the first creating unit 133 can send prompt information for prompting the user to request the owner of the live channel to add the user as the anchor to the client according to the user information.

According to video studio identifier of the live channel corresponding to the live channel information, the first creating unit 133 can add the user information to the video studio corresponding to the video studio identifier. The video studio is specifically a sub-channel of the live channel. In this embodiment, the first creating unit 133 needs to determine whether there exists other user information performing the live video in the video studio corresponding to the video studio identifier at present or not. When there exists the other user information performing the live video at present, the first creating unit 133 can terminate the live video performed by the other user information. When the live video performed by the other user information is terminated, or when there does not exist the other user information performing the live video in the video studio at present, the first creating unit 133 further determines whether the current mode of the video studio is a microphone-order mode or not. The microphone-order mode is a mode where multiple anchors (namely, multiple user information applying to be anchors) in the current video studio perform live video according to a preset order. If the current mode of the video studio is not the microphone-order mode, then when the level property of the user information is the first-level property, the first creating unit 133 sends prompt information for prompting that the microphone-order mode cannot be set to the client according to the user information, and when the level property of the user information is the second-level property, the first creating unit 133 can set the current mode of the video studio as the microphone-order mode. When the current mode of the video studio is the microphone-order mode, the first creating unit 133 further determines whether the microphone is banned to be scrambled for among the user information in the microphone-order mode or not; namely, the first creating unit 133 determines whether the user information can be set as the current anchor immediately or not. If the microphone is banned to be scrambled for, then when the level property of the user information is the first-level property, the first creating unit 133 sends prompt information for prompting that the user information cannot become an anchor at present according to the user information, and when the level property of the user information is the second-level property, the first creating unit 133 can set the user information as the current anchor.

Figure 7:
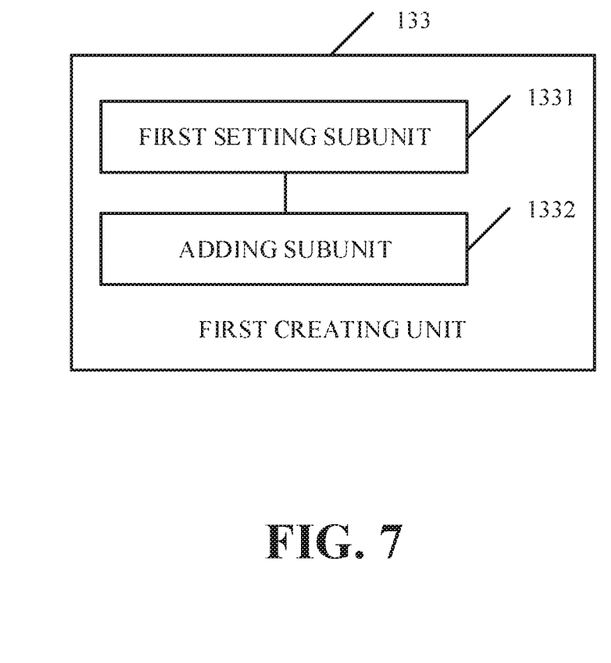
FIG. 7 is a block diagram of a first creating unit according to an embodiment of the present disclosure.

In detail, referring to FIG. 7, FIG. 7 is a block diagram of a first creating unit according to an embodiment of the present disclosure. As shown in FIG. 7, the first creating unit 133 may include: a first setting subunit 1331 and an adding subunit 1332.

The first setting subunit 1331 is used to use a preset live template to configure the live channel, and set the running state of the live channel identifier and the running state of the user information as activated states.

The adding subunit 1332 is used to add, according to video studio identifier of the live channel corresponding to the live channel information, the user information to the video studio corresponding to the video studio identifier when the running state of the live channel identifier and the running state of the user information are the activated states.

In detail, the first setting subunit 1331 can use a preset live template to configure the live channel. Wherein, the preset live template may include, but not limited to, a live game template, a live education template, and a live entertainment template. In this embodiment, the first setting subunit 1331 determines whether the current live template is the preset live template or not. When the current live template is not the preset live template, or when the responses from the application service device 1 time out, the first setting subunit 1331 automatically uses the preset live template to configure the live channel. When the live channel is not configured successfully, the first setting subunit 1331 can send prompt information for prompting that a template configuration fails to the client through the user information. When the live channel is configured successfully, or when the current live template is the preset live template, the first setting subunit 1331 sets the running state of the live channel identifier and the running state of the user information as activated states. The adding subunit 1332 can create the video studio on the live channel only if the running state of the live channel identifier and the running state of the user information are the activated states. When the running state of the live channel identifier is not the activated state and/or when the running state of the user information is not the activated state, the first setting subunit 1331 can issue an activation notification in order that a database of the application service device 1 restores the running state of the live channel identifier as the activated state and/or the running state of the user information as the activated state. Wherein, functionalities of the live channel can be used only if the running state of the live channel identifier is the activated state, and the user information can possess a functionality to be an anchor only if the running state of the user information is the activated state.

It should be noted that, before setting the running states, the first setting subunit 1331 can further determine whether a live relationship between the user information and the live channel exists or not; namely, the first setting subunit 1331 determines whether the user information can be added as an anchor or not. When the user information is the owner of the live channel, or when the live relationship between the user information and the live channel exists, the first setting subunit 1331 executes for setting the running states. When the live relationship between the user information and the live channel does not exist, and the user information is not the owner of the live channel, the first setting subunit 1331 can send prompt information for prompting the user to request the owner of the live channel to add the user as the anchor to the client according to the user information.

According to video studio identifier of the live channel corresponding to the live channel information, the adding subunit 1332 can add the user information to the video studio corresponding to the video studio identifier. The video studio is specifically a sub-channel of the live channel. In this embodiment, the adding subunit 1332 needs to determine whether there exists other user information performing the live video in the video studio corresponding to the video studio identifier at present or not. When there exists the other user information performing the live video at present, the adding subunit 1332 can terminate the live video performed by the other user information. When the live video performed by the other user information is terminated, or when there does not exist the other user information performing the live video in the video studio at present, the adding subunit 1332 further determines whether the current mode of the video studio is a microphone-order mode or not. Wherein, the microphone-order mode is a mode where multiple anchors (namely, multiple user information applying to be anchors) in the current video studio perform live video according to a preset order. If the current mode of the video studio is not the microphone-order mode, then when the level property of the user information is the first-level property, the adding subunit 1332 sends prompt information for prompting that the microphone-order mode cannot be set to the client according to the user information, and when the level property of the user information is the second-level property, the adding subunit 1332 can set the current mode of the video studio as the microphone-order mode. When the current mode of the video studio is the microphone-order mode, the adding subunit 1332 further determines whether the microphone is banned to be scrambled for among the user information in the microphone-order mode or not; namely, the adding subunit 1332 determines whether the user information can be set as the current anchor immediately or not. If the microphone is banned to be scrambled for, then when the level property of the user information is the first-level property, the adding subunit 1332 sends prompt information for prompting that the user information cannot become an anchor at present according to the user information, and when the level property of the user information is the second-level property, the adding subunit 1332 can set the user information as the current anchor.

Figure 8:
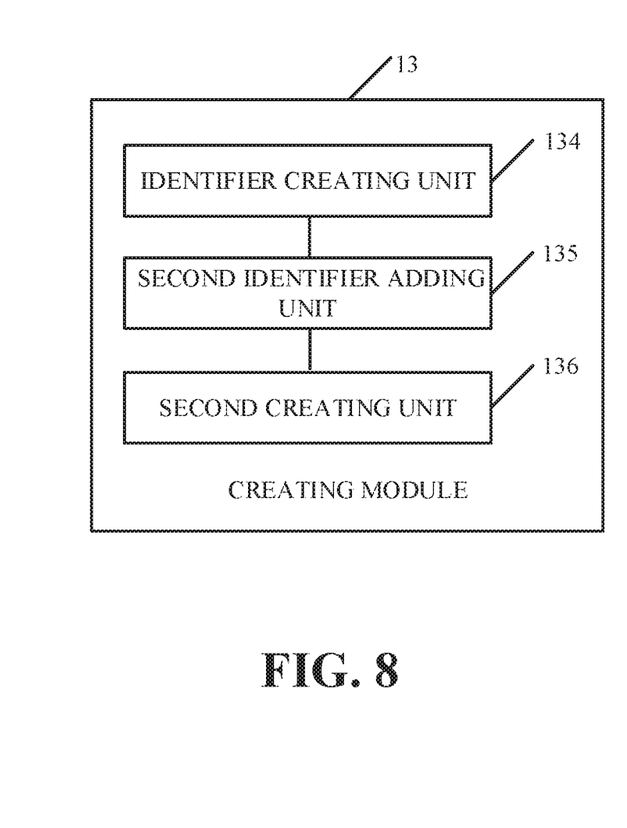
FIG. 8 is a block diagram of another creating module according to an embodiment of the present disclosure.

Optionally, referring to FIG. 8, FIG. 8 is a block diagram of another creating module according to an embodiment of the present disclosure. As shown in FIG. 8, the creating module 13 may include: an identifier creating unit 134, a second identifier adding unit 135 and a second creating unit 136.

The identifier creating unit 134 is used to create a live channel corresponding to the live channel information and a live channel identifier corresponding to the live channel when the second information acquiring unit 123 acquires the inputted live channel information according to the user information.

In specific implementations, the identifier creating unit 134 creates the live channel corresponding to the channel name of the live channel and the live channel identifier corresponding to the live channel.

The second identifier adding unit 135 is used to add the user information to the live channel according to the live channel identifier.

In specific implementations, the second identifier adding unit 135 adds the user information to the live channel according to the live channel identifier.

The second creating unit 136 is used to configure the running state of the live channel identifier and the running state of the user information, and create a video studio on the live channel after configuring the running states.

In detail, the second creating unit 136 uses a preset live template to configure the live channel, and sets the running state of the live channel identifier and the running state of the user information as activated states. When the running state of the live channel identifier and the running state of the user information are the activated states, the second creating unit 136 creates the video studio on the live channel, and at the same time, sets the mode of the video studio as a microphone-order mode. The second creating unit 136 further sets the user information as the anchor in the video studio; namely, the second creating unit 136 adds the user information to the video studio. The video studio is specifically a sub-channel of the live channel.

Figure 9:
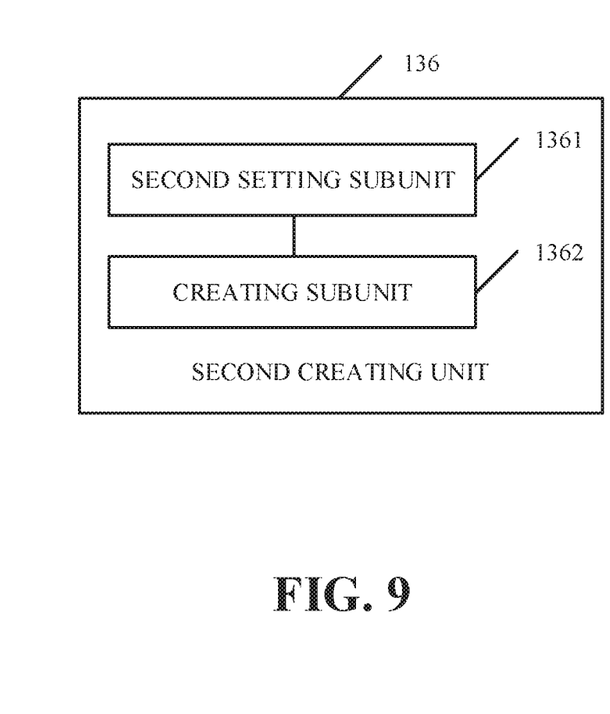
FIG. 9 is a block diagram of a second creating unit according to an embodiment of the present disclosure.

In detail, referring to FIG. 9, FIG. 9 is a block diagram of a second creating unit according to an embodiment of the present disclosure. As shown in FIG. 9, the second creating unit 136 may include: a second setting subunit 1361 and a creating subunit 1362.

The second setting subunit 1361 is used to use a preset live template to configure the live channel, and set the running state of the live channel identifier and the running state of the user information as activated states.

The creating subunit 1362 is used to create a video studio on the live channel when the running state of the live channel identifier and the running state of the user information are the activated states.

In specific implementations, the second setting subunit 1361 uses a preset live template to configure the live channel, and sets the running state of the live channel identifier and the running state of the user information as activated states. When the running state of the live channel identifier and the user information are the activated states, the creating subunit 1362 creates the video studio on the live channel, and at the same time, sets the mode of the video studio as a microphone-order mode. The creating subunit 1362 further sets the user information as the anchor in the video studio; namely, the creating subunit 1362 adds the user information to the video studio. The video studio is specifically a sub-channel of the live channel.

The outputting module 14 is used to output an interactive interface of the video studio to the client.

In detail, the outputting module 14 outputs the interactive interface of the created video studio to the client, and the client user can perform live video by means of the interactive interface of the video studio displayed on the client.

In this embodiment, the outputting module 14 can output the interactive interface of the video studio to the client according to the live video mode instructed by the live video request instruction. The live video request instruction further carries the instructed live video mode, and the live video mode may be a live process mode, a live desktop capturing mode, or a live camera capturing mode. The outputting module 14 can previously determine whether the user information has live permission or not. When the user information has the live permission, the client user can select any one mode out of the live process mode, the live desktop capturing mode and the live camera capturing mode to perform the live video. When the user information does not have the live permission, the client user can only select the live process mode to perform the live video.

The live process mode is a mode where the live video is performed by invoking processes (e.g., a game process, etc) run by the system. The live desktop capturing mode is a mode where the live video is performed by capturing the content currently displayed on a display device (e.g., a display, etc) connected with the client. The live camera capturing mode is a mode where the live video is performed by capturing the content shot by a camera connected with the client.

Since the security and privacy required by the live desktop capturing mode and the live camera capturing mode are higher than the security and privacy required by the live process mode, it is ensured that an anchor performing the live video is an authenticated user by setting the live permission, thus the security of the live video is guaranteed.

In this embodiment, when receiving a live video request instruction sent by a client, an application service device 1 acquires associated live channel information according to user information, and acquires a live channel configuration parameter set corresponding to the live channel information, uses the live channel configuration parameter set to configure a video studio, and outputs an interactive interface of the video studio to the client for display. By encapsulating the process of creating the video studio, the video studio can be automatically configured, and live video can be simply and quickly performed with one click, thus the threshold and difficulty of performing the live video are reduced, and the building and user efficiency of the video studio can be improved. At the same time, by acquiring the live channel configuration parameter set corresponding to the live channel information to configure the video studio, the interactions between the clients and the service device are decreased, thus the workload of the service device can be reduced. By setting live permission, it is ensured that an anchor who performs the live video is an authenticated user, thus the security of the live video is guaranteed.

A person having ordinary skills in the art can realize that part or whole of the processes in the methods according to the above embodiments may be implemented by a computer program instructing relevant hardware. The program may be stored in a computer readable storage medium, and execute by at least one processor of the mobile phone, the mobile computer, the tablet computer, the PDA, the media player, the smart TV, the smart watch, the pair of smart glasses and the smart bracelet and other terminal devices. When executed, the program may execute processes in the above-mentioned embodiments of methods. The storage medium may be a magnetic disk, an optical disk, a ROM (read-only memory), a RAM (random access memory), et al.

While the present disclosure has been described with reference to particular embodiments, it will be understood that the embodiments are illustrative and that the disclosure scope is not so limited. Alternative embodiments of the present disclosure will become apparent to those having ordinary skill in the art to which the present disclosure pertains. Such alternate embodiments are considered to be encompassed within the spirit and scope of the present disclosure.

What is claimed is:

1. A method for creating video studio, comprising:
receiving a live video application-based live video request instruction sent by a client, wherein the live video request instruction comprises user information;
acquiring live channel information associated with the user information, comprising:
   acquiring stored live channel information associated with the user information when determining that the live channel information associated with the user information is stored;
acquiring a live channel configuration parameter set corresponding to the live channel information, and creating a video studio according to the live channel configuration parameter set, comprising:
   acquiring a live channel identifier corresponding to the live channel information after acquiring the stored live channel information associated with the user information;
   adding the user information to a live channel corresponding to the live channel identifier; and
   configuring a running state of the live channel identifier and a running state of the user information and creating the video studio on the live channel after configuring the running states, comprising: using a preset live template to configure the live channel, and setting the running state of the live channel identifier and the running state of the user information as activated states; and adding, according to a video studio identifier of the live channel corresponding to the live channel information, the user information to the video studio corresponding to the video studio identifier when the running state of the live channel identifier and the running state of the user information are the activated states; and
outputting an interactive interface of the video studio to the client.

2. The method of claim 1, wherein acquiring the live channel information associated with the user information comprises:
acquiring inputted live channel information according to the user information when determining that the live channel information associated with the user information is not stored.

3. The method of claim 2, wherein acquiring the live channel configuration parameter set corresponding to the live channel information, and creating the video studio according to the live channel configuration parameter set comprises:
  after acquiring the inputted live channel information associated with the user information, creating a live channel corresponding to the live channel information and creating a live channel identifier corresponding to the live channel;
  adding the user information to the live channel according to the live channel identifier; and
  configuring a running state of the live channel identifier and a running state of the user information, and creating the video studio on the live channel after configuring the running states.

4. The method of claim 3, wherein configuring the running state of the live channel identifier and the running state of the user information, and creating the video studio on the live channel after configuring the running states comprises:
  using a preset live template to configure the live channel, and setting the running state of the live channel identifier and the running state of the user information as activated states; and
  creating the video studio on the live channel when the running state of the live channel identifier and the running state of the user information are the activated states.

5. The method of claim 1, wherein outputting the interactive interface of the video studio to the client comprises:
  outputting the interactive interface of the video studio to the client according to a live video mode instructed by the live video request instruction.

6. The method of claim 5, wherein the live video mode comprises a live process mode, a live desktop capturing mode, and a live camera capturing mode, and wherein
  when the user information has live permission, the live video mode instructed by the live video request instruction comprises one of the live process mode, the live desktop capturing mode, and the live camera capturing mode; and
  when the user information does not have the live permission, the live video mode instructed by the live video request instruction comprises the live process mode.

7. The method of claim 4, wherein outputting the interactive interface of the video studio to the client comprises:
  outputting the interactive interface of the video studio to the client according to a live video mode instructed by the live video request instruction.

8. A device for application service, comprising:
  a processor; and
  a memory that stores executable instructions, which when executed by the processor, become operational with the processor to:
    receive a live video application-based live video request instruction sent by a client, wherein the live video request instruction comprises user information;
    acquire live channel information associated with the user information, comprising:
      acquire stored live channel information associated with the user information when determining that the live channel information associated with the user information is stored;
      acquire a live channel configuration parameter set corresponding to the live channel information, and create a video studio according to the live channel configuration parameter set, comprising:
        acquire a live channel identifier corresponding to the live channel information when acquiring the stored live channel information associated with the user information;
        add the user information to a live channel corresponding to the live channel identifier; and
        configure a running state of the live channel identifier and a running state of the user information and create the video studio on the live channel after configuring the running states, comprising: use a preset live template to configure the live channel and set the running state of the live channel identifier and the running state of the user information as activated states; and add, according to a video studio identifier of the live channel corresponding to the live channel information, the user information to the video studio corresponding to the video studio identifier when the running state of the live channel identifier and the running state of the user information are the activated states; and
    output an interactive interface of the video studio to the client.

9. The device of claim 8, wherein the executable instruction become further operational with the processor to:
  acquire inputted live channel information according to the user information when determining that the live channel information associated with the user information is not stored.

10. The device of claim 9, wherein the executable instructions become further operational with the processor to:
  create a live channel corresponding to the live channel information and a live channel identifier corresponding to the live channel when acquiring the inputted live channel information according to the user information;
  add the user information to the live channel according to the live channel identifier; and
  configure a running state of the live channel identifier and a running state of the user information, and create the video studio on the live channel after configuring the running states.

11. The device of claim 10, wherein the executable instructions become further operational with the processor to:
  use a preset live template to configure the live channel, and set the running state of the live channel identifier and the running state of the user information as activated states; and
  create the video studio on the live channel when the running state of the live channel identifier and the running state of the user information are the activated states.

12. The device of claim 11, wherein the executable instructions become further operational with the processor to:
  output the interactive interface of the video studio to the client according to a live video mode instructed by the live video request instruction.

13. The device of claim 8, wherein the executable instructions become further operational with the processor to:
  output the interactive interface of the video studio to the client according to a live video mode instructed by the live video request instruction.

14. The device of claim 13, wherein the live video mode comprises a live process mode, a live desktop capturing mode, and a live camera capturing mode, and wherein when the user information has live permission, the live video mode instructed by the live video request instruction comprises one of the live process mode, the live desktop capturing mode and the live camera capturing mode; and when the user information does not have the live permission, the live video mode instructed by the live video request instruction comprises the live process mode.

15. A non-transitory computer readable storage medium, storing one or more programs for execution by one or more processors of a computer having a display, the one or more programs comprising instructions to:

receive a live video application-based live video request instruction sent by a client, wherein the live video request instruction comprises user information;

acquire live channel information associated with the user information, comprising:

acquire stored live channel information associated with the user information when determining that the live channel information associated with the user information is stored;

acquire a live channel configuration parameter set corresponding to the live channel information, and create a video studio according to the live channel configuration parameter set, comprising:

acquire a live channel identifier corresponding to the live channel information after acquiring the stored live channel information associated with the user information;

add the user information to a live channel corresponding to the live channel identifier; and configure a running state of the live channel identifier and a running state of the user information and create the video studio on the live channel after configuring the running states, comprising the instructions to: use a preset live template to configure the live channel, and set the running state of the live channel identifier and the running state of the user information as activated states; and add, according to a video studio identifier of the live channel corresponding to the live channel information, the user information to the video studio corresponding to the video studio identifier when the running state of the live channel identifier and the running state of the user information are the activated states; and output an interactive interface of the video studio to the client.

16. The non-transitory computer readable storage medium of claim 15, wherein the instructions to acquire the live channel information associated with the user information further comprise instructions to:

acquire inputted live channel information according to the user information when determining that the live channel information associated with the user information is not stored, and wherein the instructions to acquire the live channel configuration parameter set corresponding to the live channel information, and creating the video studio according to the live channel configuration parameter set further comprise instructions to:

after acquiring the inputted live channel information associated with the user information, create a live channel corresponding to the live channel information and create a live channel identifier corresponding to the live channel;

add the user information to the live channel according to the live channel identifier; and configure a running state of the live channel identifier and a running state of the user information, and create the video studio on the live channel after configuring the running states.

* * * * *